(12) United States Patent
Yasuda

(10) Patent No.: US 10,190,534 B2
(45) Date of Patent: Jan. 29, 2019

(54) TWO-CYCLE ENGINE

(71) Applicant: MARUYAMA MFG. CO., INC., Tokyo (JP)

(72) Inventor: Terutaka Yasuda, Tokyo (JP)

(73) Assignee: MARUYAMA MFG. CO., INC., Tokyo (JP)

( * ) Notice: Subject to any disclaimer, the term of this patent is extended or adjusted under 35 U.S.C. 154(b) by 163 days.

(21) Appl. No.: 15/055,865

(22) Filed: Feb. 29, 2016

(65) Prior Publication Data
US 2016/0258384 A1 Sep. 8, 2016

(30) Foreign Application Priority Data
Mar. 2, 2015 (JP) .................................. 2015-040461

(51) Int. Cl.
*F01P 9/00* (2006.01)
*F02F 7/00* (2006.01)
(Continued)

(52) U.S. Cl.
CPC ............ *F02F 7/0036* (2013.01); *F02B 25/00* (2013.01); *F02B 75/02* (2013.01); *F02F 3/16* (2013.01);
(Continued)

(58) Field of Classification Search
CPC .... F02B 2075/025; F02B 25/02; F02B 33/30; F02B 25/04; F02B 2700/037; F02F 1/22;
(Continued)

(56) References Cited

U.S. PATENT DOCUMENTS 3,797,467 A * 3/1974 Tenney .................. F02B 25/00
123/73 AA
3,815,558 A * 6/1974 Tenney .................. F02B 25/00
123/73 A
(Continued)

FOREIGN PATENT DOCUMENTS

JP S5900690 1/1984
JP S61164029 A 7/1986
(Continued)

OTHER PUBLICATIONS

Japanese Office Action dated May 24, 2017 for Application No. 2015040461.
(Continued)

*Primary Examiner* — Marguerite McMahon
*Assistant Examiner* — Tea Holbrook
(74) *Attorney, Agent, or Firm* — Moser Taboada

(57) ABSTRACT

A peripheral wall portion of a piston is provided with a through hole penetrating through the peripheral wall portion. A cylinder is provided with a scavenging passage having a first opening being open in a bore surface and configured to make a bore section and a crank chamber communicate with each other and is provided with a communication passage having a second opening being open in the bore surface on the other side with respect to the first opening and configured to make the bore section and the scavenging passage communicate with each other. The cylinder and piston are configured so that the through hole overlaps the second opening to communicate with the communication passage in a partial interval of a scavenging stroke in which the first opening becomes open in the bore surface on one side of the piston with reciprocal motion of the piston.

19 Claims, 12 Drawing Sheets

(51) Int. Cl.
*F02B 75/02* (2006.01)
*F02F 3/16* (2006.01)
*F02F 3/24* (2006.01)
*F02B 25/00* (2006.01)

(52) U.S. Cl.
CPC .......... *F02F 3/24* (2013.01); *F02B 2075/025* (2013.01); *Y02T 10/146* (2013.01)

(58) Field of Classification Search
CPC ...... F02F 3/24; F02F 7/0036; F02M 35/1019; F02M 69/10
See application file for complete search history.

(56) References Cited

U.S. PATENT DOCUMENTS

| | | | | |
|---|---|---|---|---|
| 4,378,762 | A * | 4/1983 | Ehrlich | F02B 25/14 123/73 A |
| 5,425,346 | A * | 6/1995 | Mavinahally | F01L 7/12 123/568.13 |
| 6,367,432 | B1 * | 4/2002 | Araki | F02B 25/14 123/65 P |
| 7,011,078 | B2 * | 3/2006 | Yamaguchi | F02B 25/14 123/527 |
| 7,536,982 | B2 * | 5/2009 | Yuasa | F01M 3/02 123/73 A |
| 8,439,005 | B2 * | 5/2013 | Yasutomi | F02B 25/18 123/65 A |
| 2001/0011532 | A1 * | 8/2001 | Nemoto | F02B 25/14 123/73 R |
| 2003/0029398 | A1 | 2/2003 | Andersson et al. | |
| 2004/0216705 | A1 * | 11/2004 | Le Bleis | F02B 25/14 123/65 S |
| 2005/0022757 | A1 * | 2/2005 | Yamaguchi | F02B 25/14 123/73 PP |
| 2005/0183679 | A1 * | 8/2005 | Yasuda | F02B 33/04 123/73 PP |
| 2006/0266310 | A1 * | 11/2006 | Yamaguchi | F02B 25/14 123/73 PP |
| 2006/0278183 | A1 * | 12/2006 | Mavinahally | F01L 7/06 123/73 V |
| 2011/0079206 | A1 * | 4/2011 | Yamazaki | F02B 25/14 123/73 PP |
| 2013/0239933 | A1 * | 9/2013 | Yasuda | F02B 75/02 123/65 R |

FOREIGN PATENT DOCUMENTS

| | | |
|---|---|---|
| JP | H3052981 | 11/1991 |
| JP | H11287124 A | 10/1999 |
| JP | 2001140650 A | 5/2001 |
| JP | 2001140651 A | 5/2001 |
| JP | 2001329844 A | 11/2001 |
| JP | 2003531995 A | 10/2003 |
| JP | 2005233087 A | 9/2005 |
| JP | 2013189906 A | 9/2013 |
| JP | 2014214727 A | 11/2014 |

OTHER PUBLICATIONS

Japanese Notice of Allowance dated Jan. 9, 2018 for Application No. P2015-040461.

* cited by examiner

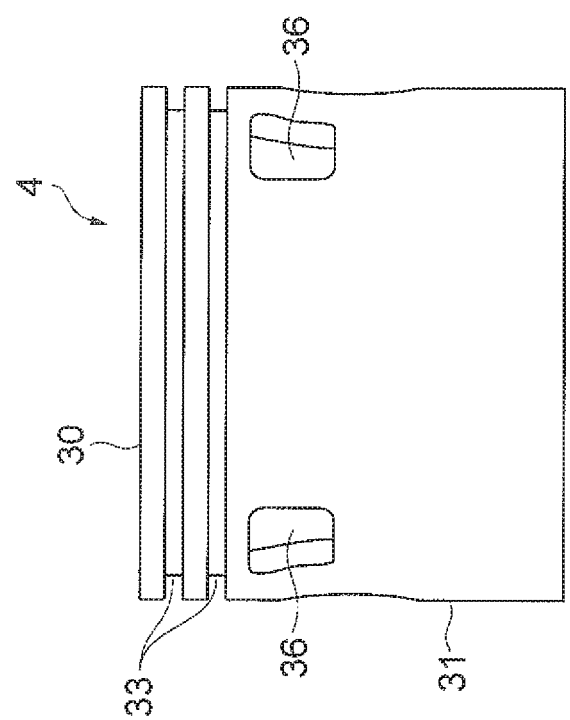
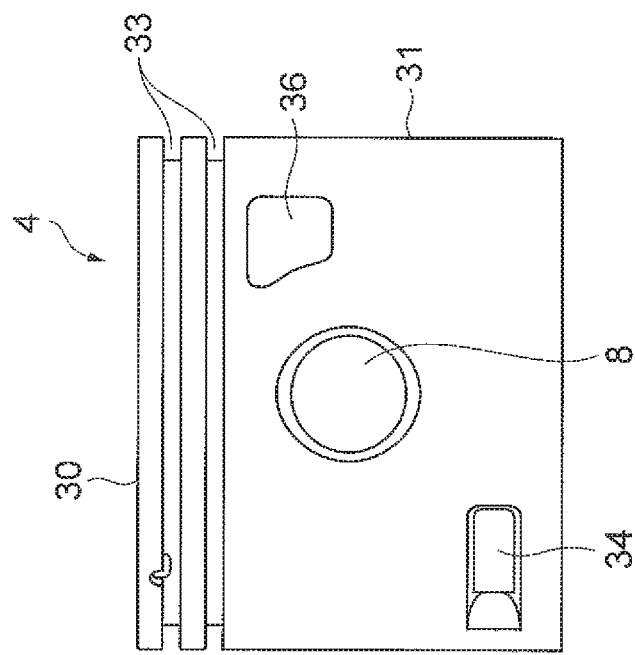

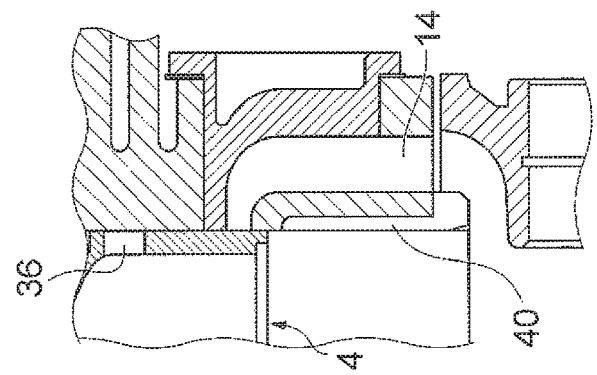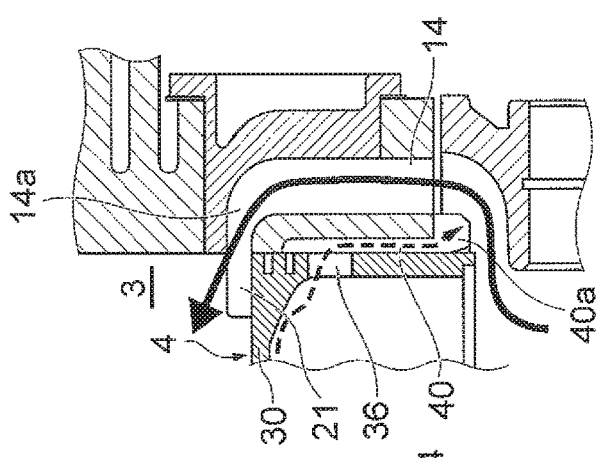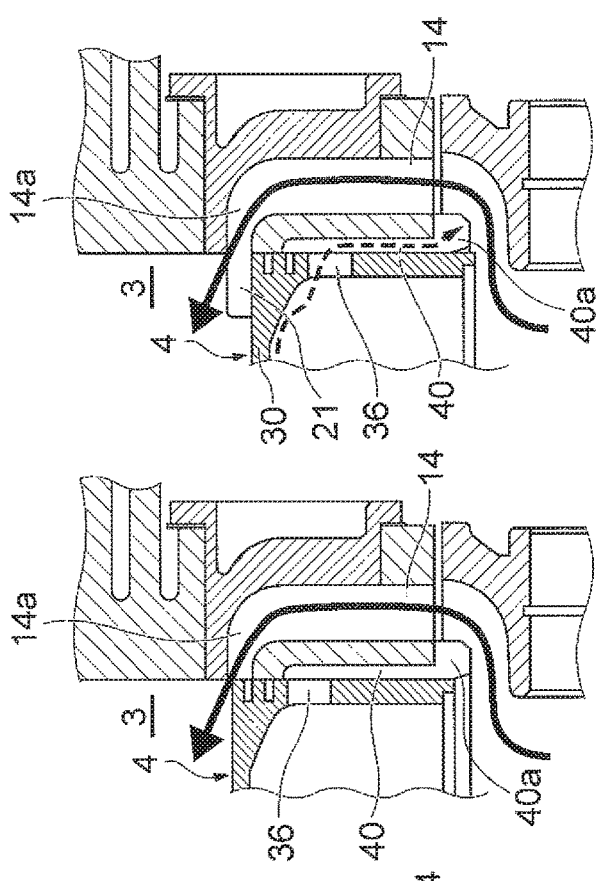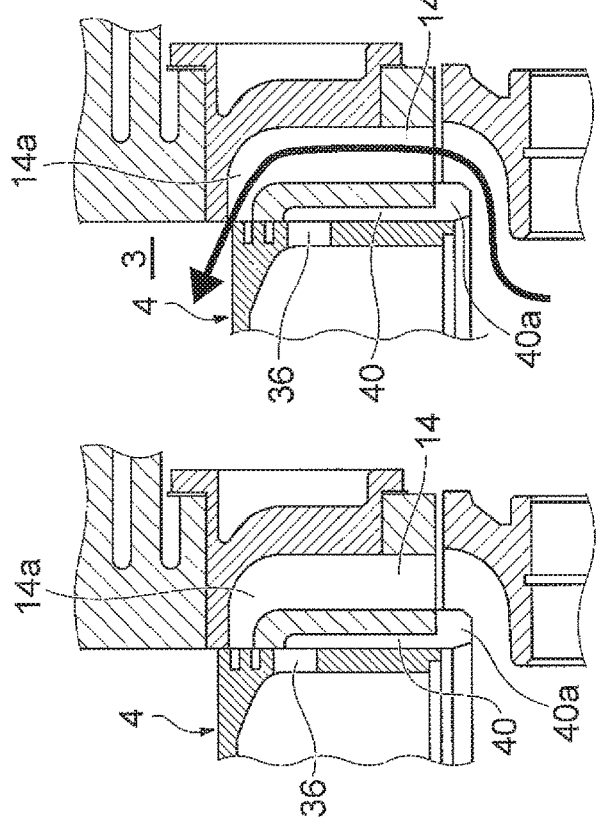

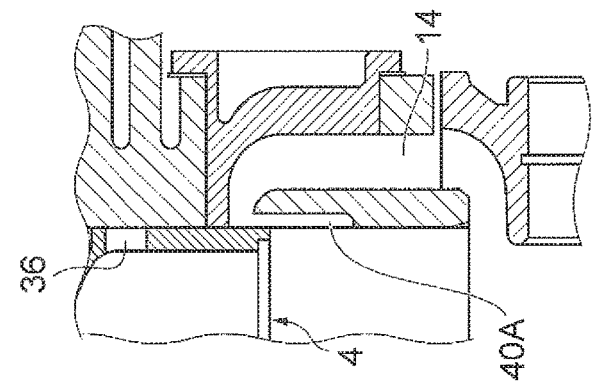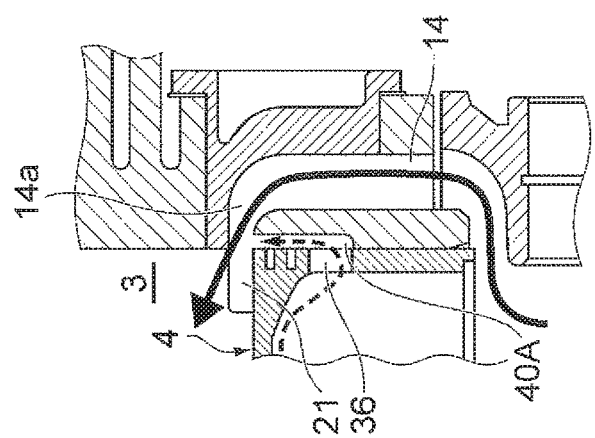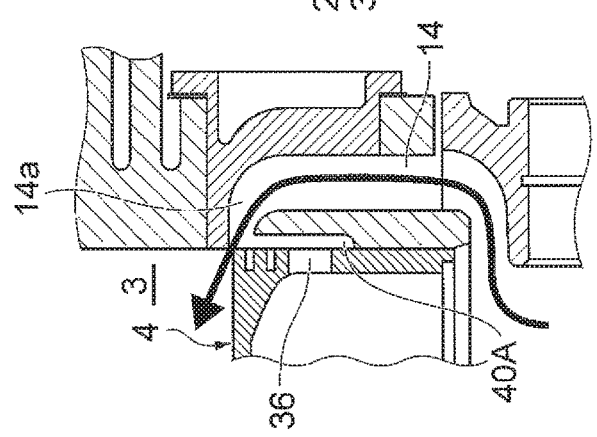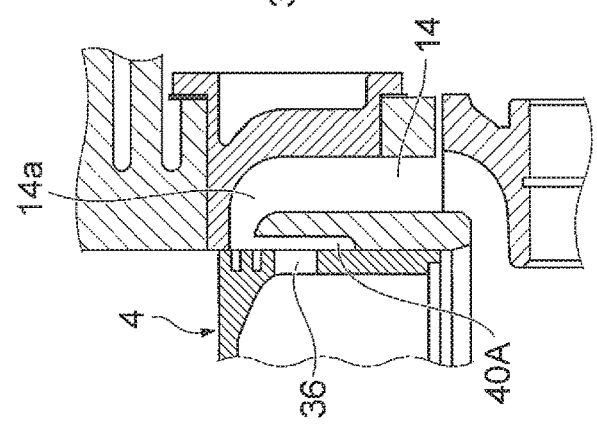

TWO-CYCLE ENGINE

CROSS-REFERENCE TO RELATED APPLICATIONS

The disclosure is based upon and claims the benefit of priority from Japanese Patent Application No. 2015-040461, filed on Mar. 2, 2015, the entire contents of which are incorporated herein by reference.

TECHNICAL FIELD

The present disclosure relates to a two-cycle engine.

BACKGROUND

The technologies described in Patent Literatures 1 to 3 below are known as technologies about two-cycle engines. In the engine described in Patent Literature 1, a side face of a piston is provided with a belt-like groove that establishes communication between an exhaust port and a scavenging port only when the piston is located at a specific position where the exhaust port and the scavenging port are closed. This causes part of burnt gas to be taken as EGR (Exhaust Gas Recirculation) gas into the scavenging port and to be circulated into a combustion chamber at earlier timing than fresh mixture gas. As a result, combustion efficiency is improved and THC (Total HydroCarbons) in exhaust gas is reduced.

The engine described in Patent Literature 2 adopts the stratified scavenging using four-flow Schnuerle scavenging as a scavenging system. The Schnuerle scavenging is a scavenging method of letting scavenging flows out of opposed scavenging ports collide with each other to form reverse swirls and scavenging the interior of the combustion chamber by the reverse swirls. Specifically, a pair of scavenging ports located on the exhaust port side of the cylinder are provided for EGR gas and a pair of scavenging ports located on the suction port side of the cylinder are provided for fresh mixture gas. Four scavenging passages scavenging directions of which are precisely determined function as guide passages for injecting the fresh mixture gas and EGR gas into arbitrary directions in the combustion chamber in the scavenging stroke and function as partitions for keeping a fresh mixture gas layer and an EGR gas layer from mixing together. The engine is configured so that the EGR gas sweeps past into the exhaust port after scavenging of the combustion chamber while the fresh mixture gas stays in the combustion chamber without sweeping past.

In the engine described in Patent Literature 3, the center of a spherical surface of a piston crown is offset by a predetermined lateral length from the center axis of the piston. This configuration provides the spherical surface of the crown with deflector-like effect and guide action for reversal of scavenging flow in the combustion chamber, thereby improving scavenging efficiency. (Patent Literature 1: Japanese Unexamined Patent Publication No. H11-287124, Patent Literature 2: Japanese Unexamined Patent Publication No. 2001-140651, Patent Literature 3: Japanese Examined Utility Model Publication No. H3-52981)

SUMMARY

A general two-cycle engine is configured to introduce fresh mixture gas into the combustion chamber in the scavenging stroke so as to draw heat from the interior of the combustion chamber and sweep past directly to the outside of the cylinder without passing through the combustion stroke. This blow-by gas (shortcut gas) contributes to reduction in temperature in the combustion chamber of the cylinder and temperature of the piston, but a large amount of the blow-by gas leads directly to degradation of exhaust gas; therefore, an exhaust-reduced two-cycle engine is configured to reduce the blow-by gas. Accordingly, the smaller the amount of blow-by gas, the higher the temperature of the combustion chamber and the temperature of the piston tend to be.

For this reason, the exhaust-reduced two-cycle engine has failed to prevent occurrence of abnormal combustion and occurrence of run-on due to the temperature increase of the combustion chamber and piston. An air-cooled engine was configured to increase the area of air-cooling fins of the cylinder and increase the size of an air-cooling fan so as to increase the amount of cooling air, but such cooling even with the larger amount of cooling air supplied to the air-cooling fins was less effective in reduction in temperature of the interior of the cylinder such as the combustion chamber and piston.

The present disclosure will describe a two-cycle engine enabling the crown portion of the piston to be cooled.

An aspect of the present disclosure is a two-cycle engine including: a cylinder having a bore section of a cylindrical shape and a combustion chamber connected continuously to one side of the bore section in an axial direction; a crankcase arranged on the other side of the cylinder in the axial direction and having a crank chamber connected continuously to the other side of the bore section; and a piston arranged in the bore section and being reciprocally movable along the axial direction between the combustion chamber and the crank chamber, wherein the piston has a crown portion opposed to the combustion chamber and a peripheral wall portion of a cylindrical shape provided continuously from the crown portion and extending along a bore surface of the bore section, the peripheral wall portion being provided with at least one through hole penetrating through the peripheral wall portion, wherein the cylinder is provided with at least one scavenging passage having a first opening being open in the bore surface and configured to make the bore section and the crank chamber communicate with each other, and at least one communication passage having a second opening being open in the bore surface on the other side with respect to the first opening and configured to make the bore section and the scavenging passage communicate with each other, wherein the second opening is located at a position corresponding to the through hole of the piston in a circumferential direction of the bore section, and wherein the cylinder and the piston are configured so that the through hole overlaps the second opening to communicate with the communication passage at least in a partial interval of a scavenging stroke in which the first opening becomes open in the bore surface on the one side of the piston with reciprocal motion of the piston.

BRIEF DESCRIPTION OF THE DRAWINGS

FIG. 3A is a front view of a piston and FIG. 3B a side view of the piston.

FIG. 5A and FIG. 5B are vertical cross-sectional views of the two-cycle engine of the first embodiment, wherein FIG. 5A is a drawing showing a state in which the piston is located at the top dead center and FIG. 5B is a drawing showing a state in which the piston is located at the bottom dead center.

FIG. 6A to FIG. 6D are cross-sectional views of the two-cycle engine of the first embodiment along a line A-A in FIG. 2, and drawings showing respective states with reciprocal motion of the piston.

FIG. 8A and FIG. 8B are vertical cross-sectional views of the two-cycle engine of the second embodiment, wherein FIG. 8A is a drawing showing a state in which the piston is located at the top dead center and FIG. 8B is a drawing showing a state in which the piston is located at the bottom dead center.

FIG. 9A to FIG. 9D are cross-sectional views of the two-cycle engine of the second embodiment along the line A-A in FIG. 2, and drawings showing respective states with reciprocal motion of the piston.

FIG. 11A and FIG. 11B are vertical cross-sectional views of the two-cycle engine of the third embodiment, wherein FIG. 11A is a drawing showing a state in which the piston is located at the top dead center and FIG. 11B is a drawing showing a state in which the piston is located at the bottom dead center.

DETAILED DESCRIPTION

Figure 1:
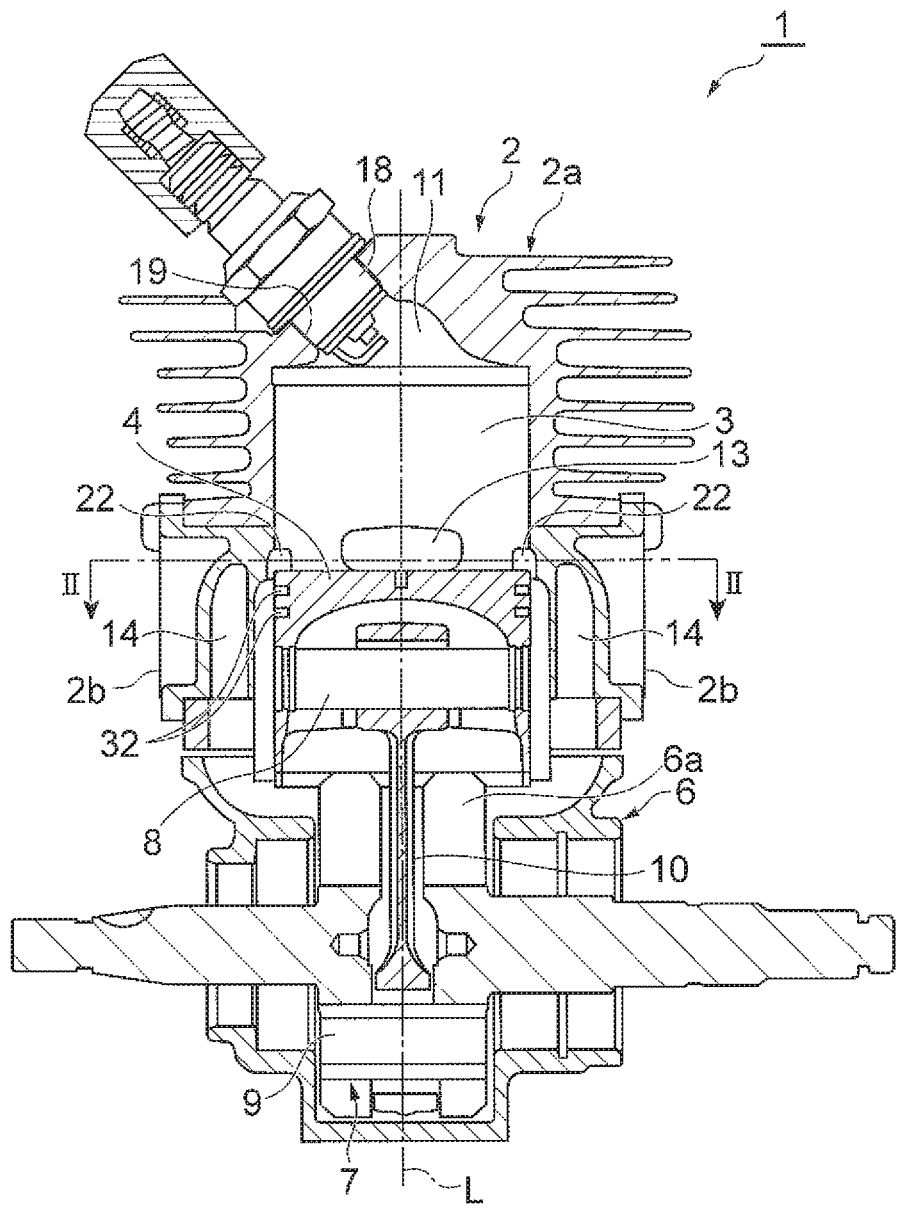
FIG. 1 is a vertical cross-sectional view of a two-cycle engine according to an embodiment of the present disclosure.

An aspect of the present disclosure is a two-cycle engine including: a cylinder having a bore section of a cylindrical shape and a combustion chamber connected continuously to one side of the lore section in an axial direction; a crankcase arranged on the other side of the cylinder in the axial direction and having a crank chamber connected continuously to the other side of the bore section; and a piston arranged in the bore section and being reciprocally movable along the axial direction between the combustion chamber and the crank chamber, wherein the piston has a crown portion opposed to the combustion chamber and a peripheral wall portion of a cylindrical shape provided continuously from the crown portion and extending along a bore surface of the bore section, the peripheral wall portion being provided with at least one through hole penetrating through the peripheral wall portion, wherein the cylinder is provided with at least one scavenging passage having a first opening being open in the bore surface and configured to make the bore section and the crank chamber communicate with each other, and at least one communication passage having a second opening being open in the bore surface on the other side with respect to the first opening and configured to make the bore section and the scavenging passage communicate with each other, wherein the second opening is located at a position corresponding to the through hole of the piston in a circumferential direction of the bore section, and wherein the cylinder and the piston are configured so that the through hole overlaps the second opening to communicate with the communication passage at least in a partial interval of a scavenging stroke in which the first opening becomes open in the bore surface on the one side of the piston with reciprocal motion of the piston.

In this two-cycle engine, the cylinder is provided with at least one communication passage configured to make the bore section and at least one scavenging passage communicate with each other. In at least a partial interval of the scavenging stroke in which the first opening of the scavenging passage becomes open in the bore surface, the through hole provided in the peripheral wall portion of the piston overlaps the second opening to communicate with the communication passage. In the scavenging stroke, scavenging gas is introduced from the crank chamber into the bore section through the scavenging passage, and thus the pressure on the crank chamber side in the piston is higher than the pressure in the scavenging passage. This pressure difference causes working gas inside the peripheral wall portion of the piston, i.e., on the back side of the crown portion to flow through the through hole and the communication passage into at least one scavenging passage. Since the working gas on the back side of the crown portion moves in this manner, the crown portion of the piston is cooled thereby.

The second opening of the communication passage is longer than the through hole in the axial direction, in this configuration, the opening of the communication passage is longer in the axial direction and therefore a communication state between the interior of the piston and at least one scavenging passage can be maintained for a relatively long time. Therefore, with production of the foregoing pressure difference, a cooling duration by the flow of the working gas can be kept long. On the other hand, the through hole in the peripheral wall portion of the piston only needs to have a certain length in the axial direction. By appropriately setting the size of the through hole, it is also possible to regulate the magnitude of a tributary scavenging flow.

The communication passage communicates with an end of the scavenging passage on the crank chamber side. The tributary scavenging flow is a flow merging into the scavenging passage through the through hole and the communication passage, with respect to a main scavenging flow introduced from the crank chamber toward the bore section. In the above configuration, since the communication passage communicates with the end serving as an entrance for the main flow of scavenging gas, a merging location of the tributary scavenging flow is located away from the end on the bore section side which determines an introduction direction of scavenging gas into the bore section. Therefore, the working gas merging from the communication passage produces no influence on the introduction direction of scavenging gas into the bore section.

In an aspect, the communication passage may communicate with an end of the scavenging passage on the bore section side.

In an aspect, the communication passage may communicate with a central portion of the scavenging passage.

The cylinder is provided with a suction port configured to communicate with the crank chamber through the bore section, and an exhaust port configured to communicate with the bore section and arranged so as to be opposed to the suction port in a radial direction of the bore section; the scavenging passage includes a pair of suction-side scavenging passages arranged away from each other in the circumferential direction of the bore section, and a pair of exhaust-side scavenging passages arranged away from each other in the circumferential direction of the bore section and arranged on the exhaust port side with respect to the suction-side scavenging passages; the pair of suction-side scavenging passages is configured to introduce a working gas containing fuel into the bore section in the scavenging stroke; the pair of exhaust-side scavenging passages is configured to introduce a non-working gas with a lower content of fuel than the working gas, into the bore section in the scavenging stroke; the communication passage makes the bore section and the suction-side scavenging passage communicate with each other.

In this configuration, the working gas is introduced from the crank chamber into the bore section through the pair of suction-side scavenging passages, and the non-working gas is introduced from the crank chamber into the bore section through the pair of exhaust-side scavenging passages, in the scavenging stroke. The aforementioned pressure difference causes the working gas inside the peripheral wall portion of the piston, i.e., on the back side of the crown portion to flow through the through hole and the communication passage into at least one suction-side scavenging passage. Since the working gas on the back side of the crown portion moves in this manner, the crown portion is cooled. Since the working gas flows into the suction-side scavenging passage, it produces no influence on supply of the non-working gas through the exhaust-side scavenging passage, thereby maintaining the stratified scavenging and, in turn, maintaining a reduction effect of blow-by gas.

Embodiments of the present disclosure will be described below with reference to the drawings. The same elements will be denoted by the same reference signs in the description of the drawings, without redundant description. "Upper and lower" are used in the following description, based on a situation in which a cylinder main body 2a is set upright so that a bore section 3 of a cylinder 2 extends in the vertical direction while an opening for a piston 4 to be inserted therein faces down. "Upper side" corresponds to an upper side in a direction of axis L of the bore section 3 and "lower side" to a lower side in the direction of axis L.

Figure 2:
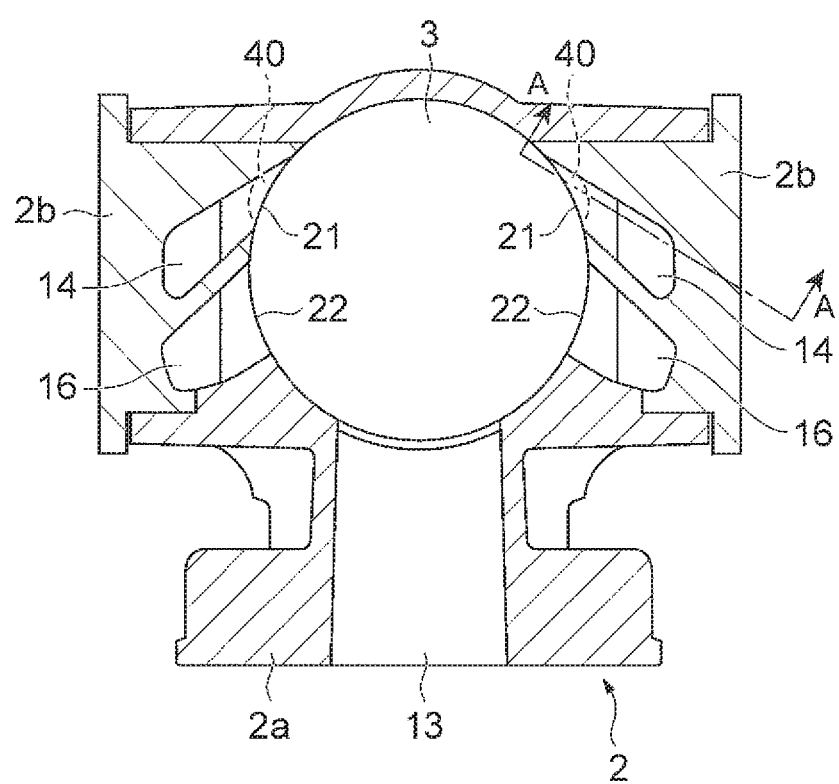
FIG. 2 is a cross-sectional view taken along a line II-II in FIG. 1.

As shown in FIGS. 1 and 2, the engine (two-cycle engine) 1 is a two-cycle engine that adopts the Schnuerle system as a scavenging method, and is mounted, for example, on a brush cutter, a backpack power sprayer, or the like. The engine 1 has the cylinder 2, the piston 4 reciprocally moving in the bore section 3 in the cylinder 2, a crankcase 6 coupled to the lower side of the cylinder 2, and a crank mechanism 7 arranged in a crank chamber 6a of the crankcase 6. A piston pin 8 disposed in the piston 4 and a crank pin 9 of the crank mechanism 7 disposed in the crankcase 6 are connected by a connecting rod 10. The piston 4 is arranged in the bore section 3 so that it can reciprocally move along the direction of axis L between a combustion chamber 11 and the crank: chamber 6a.

Formed in the cylinder 2 are the combustion chamber 11, the bore section 3 of a cylindrical shape connected continuously to the combustion chamber 11 and configured for the piston 4 to be inserted therein, a suction port 12 (cf. FIG. 4) and an exhaust port 13 which are con figured to communicate with the bore section 3, a pair of suction-side scavenging passages 14, 14, and a pair of exhaust-side scavenging passages 16, 16. The cylinder 2 has the cylinder main body 2a and, scavenging cassettes 2b, 2b fitted in the lower part of the cylinder main body 2a. The scavenging cassettes 2b, 2b are fitted in two openings which are formed so as to be opposed to each other in a radial direction of the bore section 3, to be fixed there. The pair of suction-side scavenging passages 14, 14 and the pair of exhaust-side scavenging passages 16, 16 are formed by the cylinder main body 2a and the scavenging cassettes 2b, 2b.

The bore section 3 has a bore surface 3a of a circular column shape and extends along the direction of axis L in the cylinder 2. The bore section 3 is open on the bottom dead center side (the lower side in FIG. 1) to communicate with the crank chamber 6a. The combustion chamber 11 of a recessed shape is formed at the end of the bore section 3 on the top dead center side and a discharge electrode such as a spark plug 18 is arranged inside the combustion chamber 11. The combustion chamber 11 is provided with a spark plug attachment hole 19 to which the spark plug 18 is attached.

The suction port 12 and the exhaust port 13 are configured each to communicate with the bore section 3 and, in the direction of axis L, the exhaust port 13 is located slightly closer to the top dead center than the suction port 12. The suction port 12 and the exhaust port 13 are arranged with approximately 180° deviation from each other in the circumferential direction of the bore section 3 so as to be opposed to each other in a radial direction of the bore section 3.

The suction-side scavenging passages 14, 14 are provided for introducing fresh mixture gas (working gas) containing fuel into the bore section 3 and combustion chamber 11 in the scavenging stroke and extend along the direction of axis L inside the side wall of the cylinder 2. The fresh mixture gas is a fuel-air mixture for operation of the engine consisting of a mixture of air with gasoline as fuel. The ends on the top dead center side of the suction-side scavenging passages 14, 14 are configured each to communicate with the bore section 3 approximately at the same position as the exhaust port 13 in the direction of axis L. As shown in FIG. 2, the ends on the top dead center side of the suction-side scavenging passages 14, 14 opening in the bore section 3 are defined as suction-side scavenging openings (first openings) 21, 21. The suction-side scavenging passages 14, 14 are arranged away from each other in the circumferential direction of the bore section 3. More specifically, the suction-side scavenging passages 14, 14 are arranged approximately in line symmetry with respect to an imaginary line connecting the suction port 12 and the exhaust port 13 in the radial direction. The suction-side scavenging passages 14, 14 are provided so as to direct the fresh mixture gas introduced into the bore section 3, toward the side closer to the suction port 12. The ends on the bottom dead center side of the suction-side scavenging passages 14, 14 communicate with the aforementioned crank chamber 6a.

The exhaust-side scavenging passages 16, 16 are provided for introducing EGR gas (non-working gas) as exhaust gas after combustion with a lower fuel content than the working gas, into the bore section 3 and combustion chamber 11 in the scavenging stroke and extend along the direction of axis L inside the side wall of the cylinder 2. The ends on the top dead center side of the exhaust-side scavenging passages 16, 16 are configured each to communicate with the bore section 3 approximately at the same position as the exhaust port 13 in the direction of axis L. The ends on the top dead center side of the exhaust-side scavenging passages 16, 16 opening in the bore section 3 are defined as exhaust-side scavenging openings (first openings) 22, 22. The exhaust-side scavenging passages 16, 16 are arranged away from each other in the circumferential direction of the bore section 3. More specifically, the exhaust-side scavenging passages 16, 16 are arranged approximately in line symmetry with respect to the imaginary line connecting the suction port 12 and the exhaust port 13 in the radial direction. The exhaust-side scavenging passages 16, 16 are provided so as to direct the EGR gas introduced into the bore section 3, toward the side closer to the suction port 12. The ends on the bottom dead center side of the exhaust-side scavenging passages 16, 16 communicate with the aforementioned crank chamber 6a.

For implementing the stratified scavenging, the directions and shapes of the suction-side scavenging passages 14, 14 and the exhaust-side scavenging passages 16, 16 are precisely determined. The suction-side scavenging passages 14, 14 and the exhaust-side scavenging passages 16, 16 have a role as scavenging runways. A guide 14a (cf. FIG. 4) for guiding the fresh mixture gas into a predetermined introduction direction is provided at each of the ends on the top dead center side of the suction-side scavenging passages 14, 14. A guide 16a (cf. FIG. 4) for guiding the EGR gas into a predetermined introduction direction is provided at each of the ends on the top dead center side of the exhaust-side scavenging passages 16, 16.

The piston 4 will be described with reference to FIGS. 3A and 3B. The piston 4 has a crown portion 30 of a circular column shape constituting the top part of the piston 4, and a peripheral wall portion 31 of a cylindrical shape provided continuously from the peripheral edge of the crown portion 30. Two piston rings 32 (cf. FIG. 1) for maintaining airtightness inside the combustion chamber 11 an the bore section 3 are fixed to the outer periphery of the crown portion 30. The piston rings 32 are fitted in grooves 33 for rings. The piston 4 is arranged in the bore section 3 so as to reciprocally move therein. The crown portion 30 is opposed to the combustion chamber 11 and the peripheral wall portion 31 extends along the bore surface 3a of the bore section 3.

Groove-like depressions 34 each extending in the range from the exhaust port 13 to the exhaust-side scavenging opening 22 on the outer periphery of the peripheral wall portion 31 are formed at the lower end of the peripheral wall portion 31. Each depression 34 makes the exhaust port 13 and the exhaust-side scavenging passage 16 communicate with each other when the piston 4 is located near the top dead center. Each depression 34 causes the exhaust port 13 to communicate with the exhaust-side scavenging passage 16 when the piston 4 is located near the top dead center, whereby the exhaust gas after combustion is taken as EGR gas from the exhaust port 13 into the exhaust-side scavenging passage 16. Namely, the exhaust-side scavenging passage 16 can be filled with the EGR gas in its upper part and can be filled with the fresh mixture gas below the EGR gas. In scavenging with the piston 4 moving down, the EGR gas first flows into the cylinder 2 and then the fresh mixture gas flows into the cylinder 2. This configuration enables the so-called stratified scavenging in the engine 1.

In the upper part of the peripheral wall portion 31 of the piston 4, two through holes 36 are provided at positions corresponding to the suction-side scavenging passages 14, 14 in the circumferential direction of the bore section 3. The through holes 36 penetrate through the peripheral wall portion 31 in radial directions of the peripheral wall portion 31. The through holes 36 are, for example, of a rectangular shape. The through holes 36 have, for example, the width enlarged in their upper part (on the combustion chamber 11 side) and narrowed in their lower part (on the crank chamber 6a side). The through holes 36 are located immediately below the two piston rings 32. Namely, the through holes 36 make the exterior space of the piston 4 communicate with the interior space of the piston 4 which is also the space on the back side of the crown portion 30.

Figure 4:
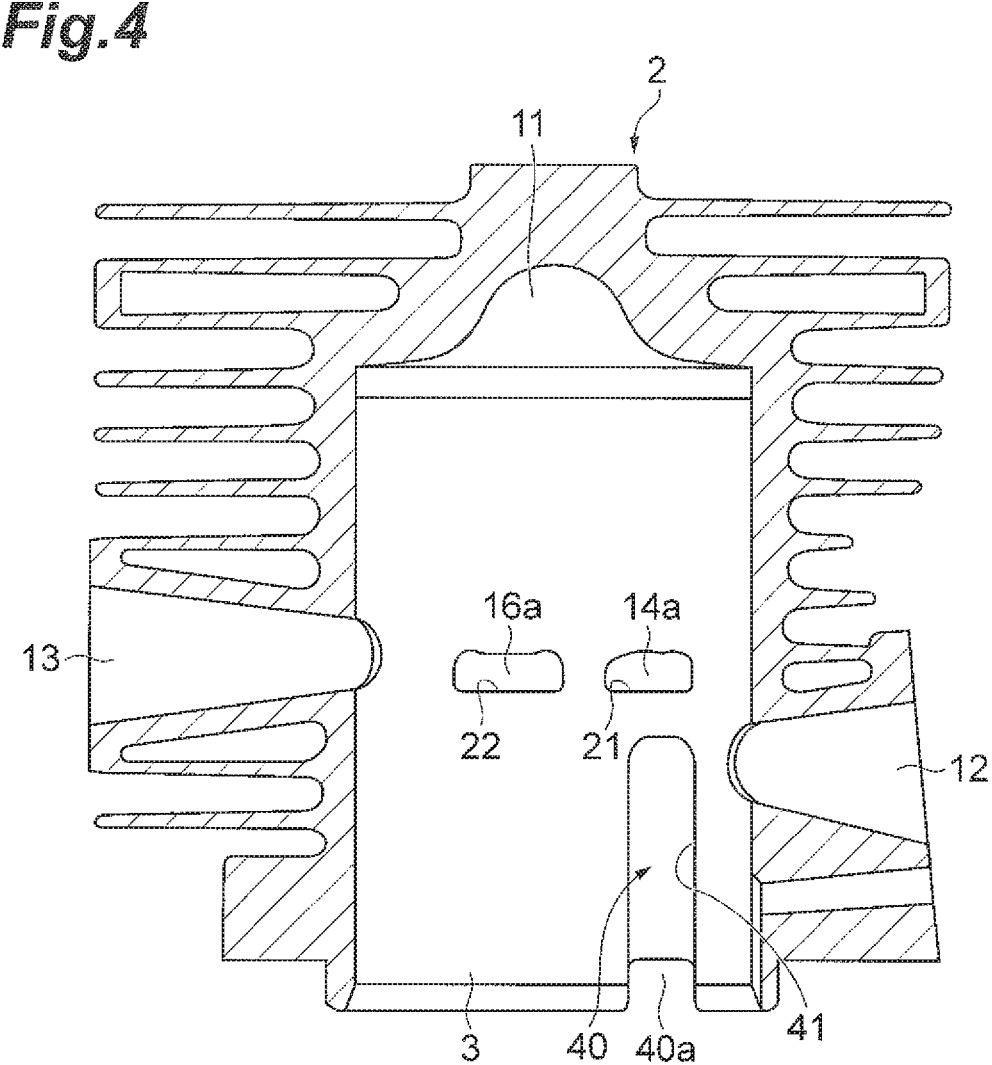
FIG. 4 is a vertical cross-sectional view of a cylinder of the two-cycle engine according to the first embodiment.
Figure 5A:
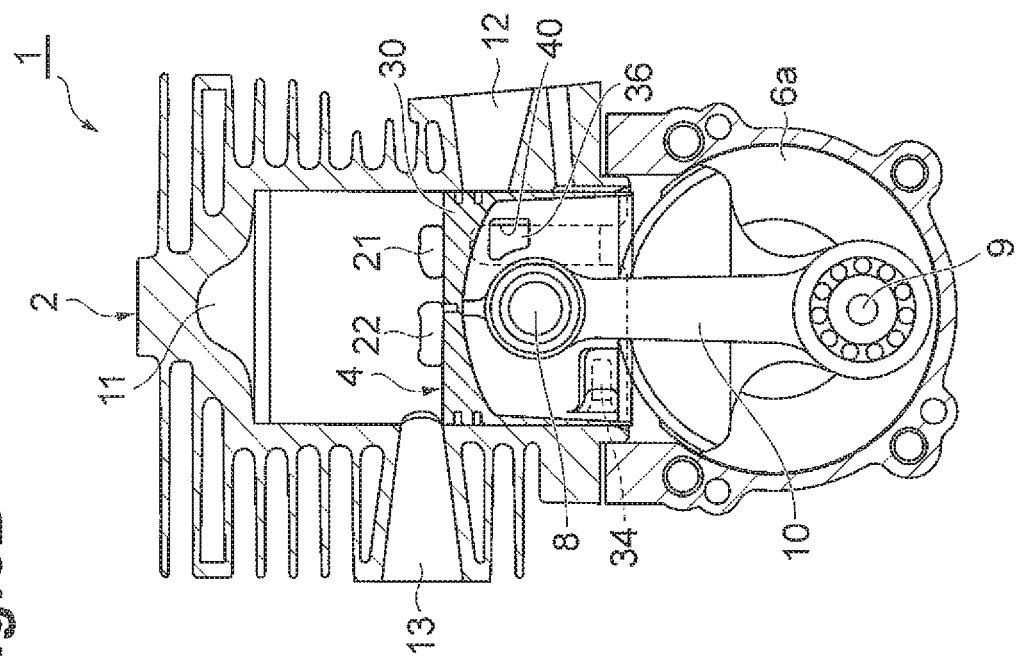
Figure 5B:
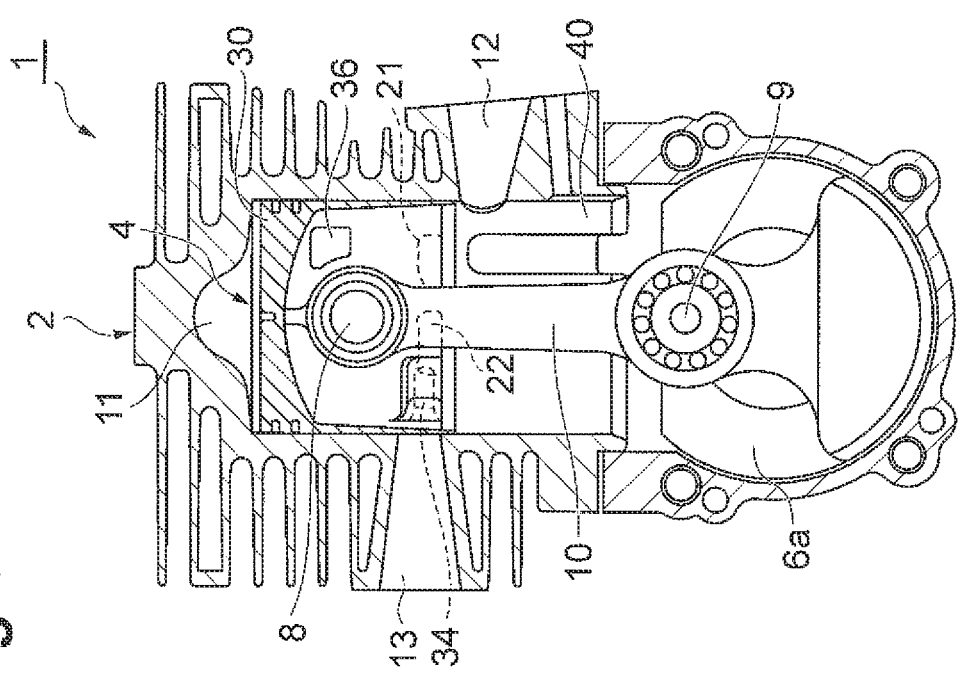

Tributary passages of fresh mixture gas will be described with reference to FIG. 4. As shown in FIG. 4, the cylinder 2 is provided with groove-like communication passages 40, each of which is open to the bore section 3, below the suction-side scavenging opening 21 of the suction-side scavenging passage 14. The communication passage 40 extends approximately in parallel with the direction of axis L while having a predetermined width. A circumferential width of the communication passage 40 is smaller than a circumferential width of the suction-side scavenging opening 21 and larger than a circumferential width of the through hole 36. The communication passage 40 has a rectangular opening (second opening) 41 which is open to the bore section 3. In the circumferential direction, a position of an end site on the suction port 12 side of the opening 41 coincides with a position of an end side on the suction port 12 side of the suction-side scavenging opening 21. In the circumferential direction, an end side on the exhaust port 13 side of the opening 41 is located slightly closer to the suction port 12 side than an end side on the exhaust port 13 side of the suction-side scavenging opening 21. An upper end of the communication passage 40 is terminated in the range of height where the suction port. 12 is provided. A lower end 40a of the communication passage 40 is opened and expanded at the lower end of the cylinder main body 2a and communicates with the crank chamber 6a and the lower end of the suction-side scavenging passage 14 (the end on the crank chamber 6a side). In other words, the communication passage 40 communicates with the lower end of the suction-side scavenging passage 14, at its lower end only. In this manner, the communication passage 40 communicates with the bore section 3 and the suction-side scavenging passage 14.

As shown in FIGS. 5A and 5B and FIGS. 6A to 6D, the opening 41 is longer than the through hole 36 of the piston 4 in the direction of axis L. The cylinder main body 2a with the communication passages 40 as described above can be molded by a well-known molding method.

Next, the operation in the engine 1 will be described. First, with an upward motion of the piston 4 from the bottom dead center toward the top dead center, the suction-side scavenging openings 21, exhaust-side scavenging openings 22, and exhaust port 13 are closed by the piston 4, whereby the fresh mixture gas in the combustion chamber 11 is compressed. With a further ascent of the piston 4, the suction port 12 comes to communicate with the crank chamber 6a through the bore section 3, whereby the fresh mixture gas is introduced into the crank chamber 6a (cf. FIG. 5A and FIG. 6D).

When the piston 4 reaches the vicinity of the top dead center, the mixture comes to explode in the combustion chamber 11 to lower the piston 4 toward the bottom dead center. When the piston 4 is located in the vicinity of the top dead center, the exhaust port 13 and the exhaust-side scavenging openings 22 come to communicate with each other through the depressions 34 of the piston 4 (cf. FIG. 5A), whereby the exhaust gas after combustion one cycle before is filled as EGR gas into the exhaust-side scavenging passages 16.

With a further descent of the piston, the exhaust port 13 becomes open to discharge combustion gas (cf. FIG. 6A). Then, after a slight delay from the opening timing of the exhaust port 13, the upper edges of the suction-side scavenging openings 21 and the exhaust-side scavenging openings 22 become exposed in the bore section 3 to initiate the scavenging stroke. At this time the interior of the exhaust-side scavenging passages 16 is filled with the EGR gas and the interior of the suction-side scavenging passages 14 is filled with the fresh mixture gas. Next, the exhaust-side scavenging openings 22 become open, whereby the EGR gas is introduced into the bore section 3 by a pressure difference between the combustion chamber 11 and bore section 3 and the exhaust-side scavenging passages 16. Likewise, when the suction-side scavenging openings 21 become open, the fresh mixture gas is introduced into the bore section 3 by a pressure difference between the combustion chamber 11 and bore section 3 and the suction-side scavenging passages 14 (cf. FIG. 6B).

When the suction-side scavenging opening 21 of each suction-side scavenging passage 14 becomes open to the bore section 3, introduction of fresh mixture gas is started from the main flow of the suction-side scavenging passage 14 into the bore section 3 to initiate the scavenging stroke (cf. FIG. 6B). With a descent of the piston 4, the fresh mixture gas passes through the suction-side scavenging passage 14 to flow from the suction-side scavenging opening 21 into the bore section 3. At the same time as it, each exhaust-side scavenging passage 16 becomes open, whereby the EGR gas and the fresh mixture gas flow in this order from the suction-side scavenging opening 22 into the bore section 3. This implements the so-called stratified scavenging.

At this point, each through hole 36 of the piston 4 provided below the piston rings 32 overlaps the opening 41 provided in the cylinder 2, so as to make the through hole 36 communicate with the communication passage 40, whereby a tributary flow of fresh mixture gas is formed so as to merge into the lower end of the suction-side scavenging passage 14. The communication timing of this tributary flow is different from the scavenging timing which is indispensable to performance requirements of the engine 1. Namely, the through hole 36 and the communication passage 40 can be made to communicate with each other at arbitrary timing determined by the position of the through hole 36 and the position of the communication passage 40.

Next, because of the pressure difference between the suction-side scavenging passage 14 and the communication passage 40 in conjunction with a start of flow of the main flow of fresh mixture gas with the suction-side scavenging opening 21 becoming open to the bore section 3, a slight flow with movement of fresh mixture gas is formed at the lower end of the suction-side scavenging passage 14 of the main flow, from the tributary flow formed by the through hole 36 and the communication passage 40 (FIG. 6C). At this time, the fresh mixture gas inside the piston 4, i.e., on the back side of the crown portion 30 is moved and, in conjunction with it, the fresh mixture gas having stayed inside the piston 4 is replaced with another to cool the crown portion 30.

In the engine 1, a temperature reduction effect is achieved on the interior of be cylinder 2, for which it was difficult to be cooled by cooling with blow of air from the outside. Furthermore, since part of the fresh mixture gas can draw heat from the crown portion 30 while moving along the back side of the crown portion 30 of the piston 4 before introduced into the bore section 3, the fresh mixture gas becomes easier to burn with facilitation of evaporation of the fresh mixture gas and with increase in temperature of the fresh mixture gas in the suction-side scavenging passage 14 at the time of merge of the fresh mixture gas in the suction-side scavenging passage 14 of the main flow with the fresh mixture gas in the communication passage 40 of the tributary flow. This can increase the output of the engine 1 while reducing unburned gas components (THC) contained in the exhaust gas.

The required amount of cooling air for the cylinder 2 can be made smaller because of the reduction effect of the temperature inside the cylinder 2 in conjunction with the temperature reduction of the piston 4, This leads to decrease in area of the cooling fins of the cylinder 2, which reduces the weight of the cylinder and the diameter of the cooling fan, so as to reduce the weight of the engine 1 eventually.

The opening 41 of the communication passage 40 to the bore section 3 is longer than the through hole 36 in the direction of axis L. Since the opening 41 of the communication passage 40 is long in the direction of axis L, a communication state between the interior of the piston 4 and the suction-side scavenging passage 14 can be maintained for a relatively long time in a period in which the piston 4 moves in the vicinity of the bottom dead center. Therefore, with production of the aforementioned pressure difference, a cooling duration by the flow of fresh mixture gas can be kept long. On the other hand, the through hole 36 in the peripheral wall portion 31 of the piston 4 only needs to have a certain length in the direction of axis L. By appropriately setting the size of the through hole 36, it is also feasible to regulate the magnitude of the tributary scavenging flow.

Furthermore, in the engine 1, the tributary scavenging flow is a flow merging into the suction-side scavenging passage 14 through the through hole 36 and the communication passage 40, with respect to the main scavenging flow introduced from the crank chamber 6a toward the bore section 3. Therefore, the fresh mixture gas merging from the communication passage 40 produces little influence on the original scavenging direction determined by the suction-side scavenging passage 14, i.e., on the introduction direction into the bore section 3. Particularly, since the communication passage 40 communicates with the lower end of the suction-side scavenging passage 14, the merging location of the tributary scavenging flow is separate from the guide portion 14a, which is the end on the bore section 3 side to determine the introduction direction of fresh mixture gas into the bore section 3 (cf. FIGS. 6B and 6C). Therefore, the fresh mixture gas merging from the communication passage 40 does not affect the introduction direction of fresh mixture gas into the bore section 3. Furthermore, since the lower end 40a of the communication passage 40 is open at the lower end of the cylinder main body 2a, a die can be pulled out downward in molding of the cylinder 2, which does not pose problems of need for additional processing and complication of dies and which facilitates molding.

In addition, since the fresh mixture gas merges into the suction-side scavenging passage 14, it produces no influence on the supply of EGR gas through the exhaust-side scavenging passage 16, thereby maintaining the stratified scavenging and, in turn, maintaining the reduction effect of blow-by gas. Namely, since the independent scavenging passage shapes of the exhaust-side scavenging passage 16 for EGR gas and the suction-side scavenging passage 14 for fresh mixture gas can be maintained, the temperature of the crown portion 30 can be reduced without degradation of the characteristics of the emission reduction technique of the stratified scavenging using the EGR gas.

As described above, the reduction effect of blow-by gas by the pair of suction-side scavenging passages 14, 14 for introduction of fresh mixture gas and the pair of exhaust-side scavenging passages 16, 16 for introduction of EGR gas is maintained, without decrease in suction efficiency. Therefore, no degradation is caused in emission performance. The cooling of the crown portion 30 of the piston 4 prevents the occurrence of abnormal combustion and run-on. The suction efficiency is a value obtained by dividing a weight of fuel having been introduced into the combustion chamber 11 at a time of closure of the exhaust port 13 by a weight of fuel having been supplied to the engine 1. The run-on refers to a phenomenon in which the engine runs on even after the engine is switched off to terminate ignition of the spark plug.

The engine 1A of the second embodiment will be described with reference to FIGS. 7, 8A, and 8B and FIGS. 9A to 9D. The engine 1A is different from the engine 1 of the first embodiment, in that the engine 1A has a groove-like communication passage 40A communicating with the upper end of the suction-side scavenging passage 14 (the end on the bore section 3 side), in place of the groove-like communication passage 40 communicating with the lower end of the suction-side scavenging passage 14.

Figure 7:
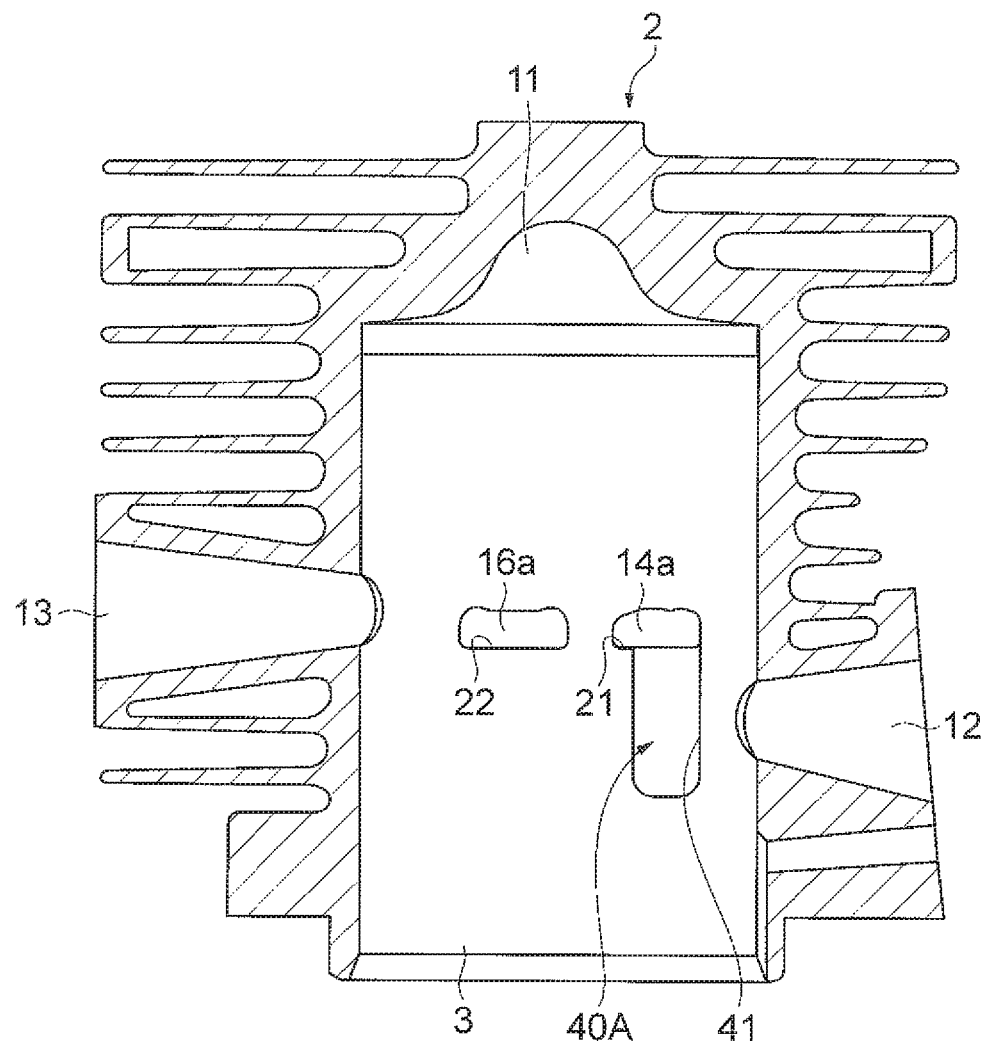
FIG. 7 is a vertical cross-sectional view of the cylinder of the two-cycle engine according to the second embodiment.
Figure 8A:
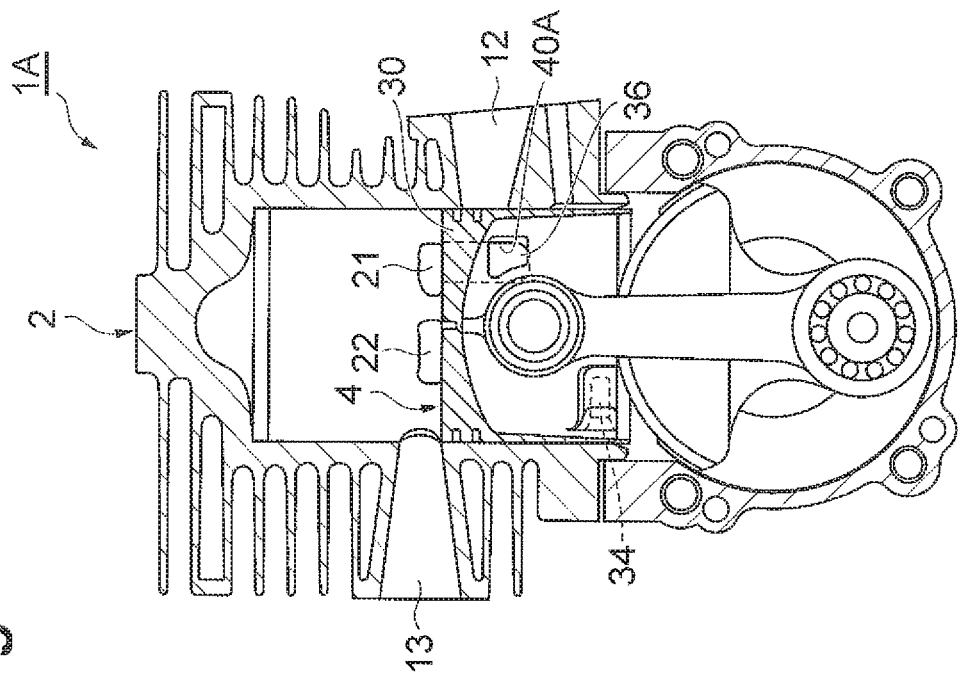
Figure 8B:
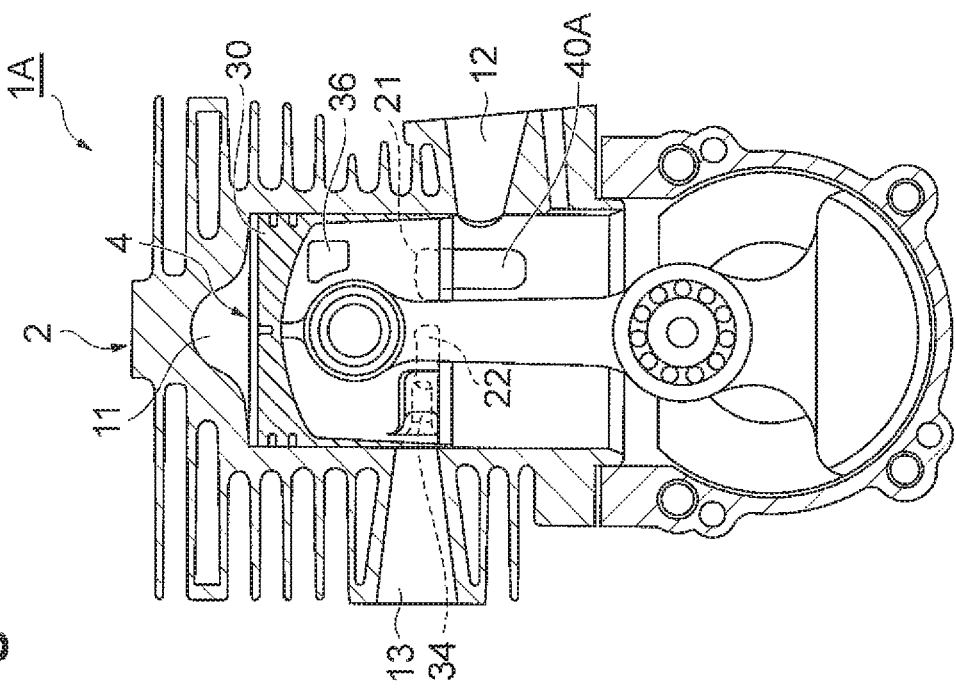

As shown in FIG. 7, the cylinder is provided with the groove-like communication passage 40A which is open to the bore section 3, below the suction-side scavenging opening 21 of the suction-side scavenging passage 14. The communication passage 40A extends approximately in parallel with the direction of axis L while having a predetermined width. A circumferential width of the communication passage 40A is the same as that of the communication passage 40 of the engine 1. The upper end of the communication passage 40A communicates with the guide portion 14a of the suction-side scavenging passage 14. The lower end of the communication passage 40A is terminated above the lower end of the cylinder main body 2a. In other words, the communication passage 40A communicates with the upper end of the suction-side scavenging passage 14, at its upper end only. In this manner, the communication passage 40A communicates with the bore section 3 and the suction-side scavenging passage 14. As shown in FIGS. 8A and 8B and FIGS. 9A to 9D, the opening 41 is longer than the through hole 36 of the piston 4, in the direction of axis L.

In the engine 1A with this communication passage 40A, the through hole 36 and the communication passage 40A come to communicate with each other at the timing shown in FIGS. 8A and 8B and FIGS. 9A to 9D, thereby achieving the same action and effect as the engine 1.

The engine 1B of the third embodiment will be described with reference to FIGS. 10, 11A, and 11B and FIGS. 12A to 12D. The engine 1B is different from the engine 1 of the first embodiment, in that the engine 1B has a communication passage 40B of a rectangular prism shape communicating with the central portion of the suction-side scavenging passage 14, in place of the groove-like communication passage 40 communicating with the lower end of the suction-side scavenging passage 14.

Figure 10:
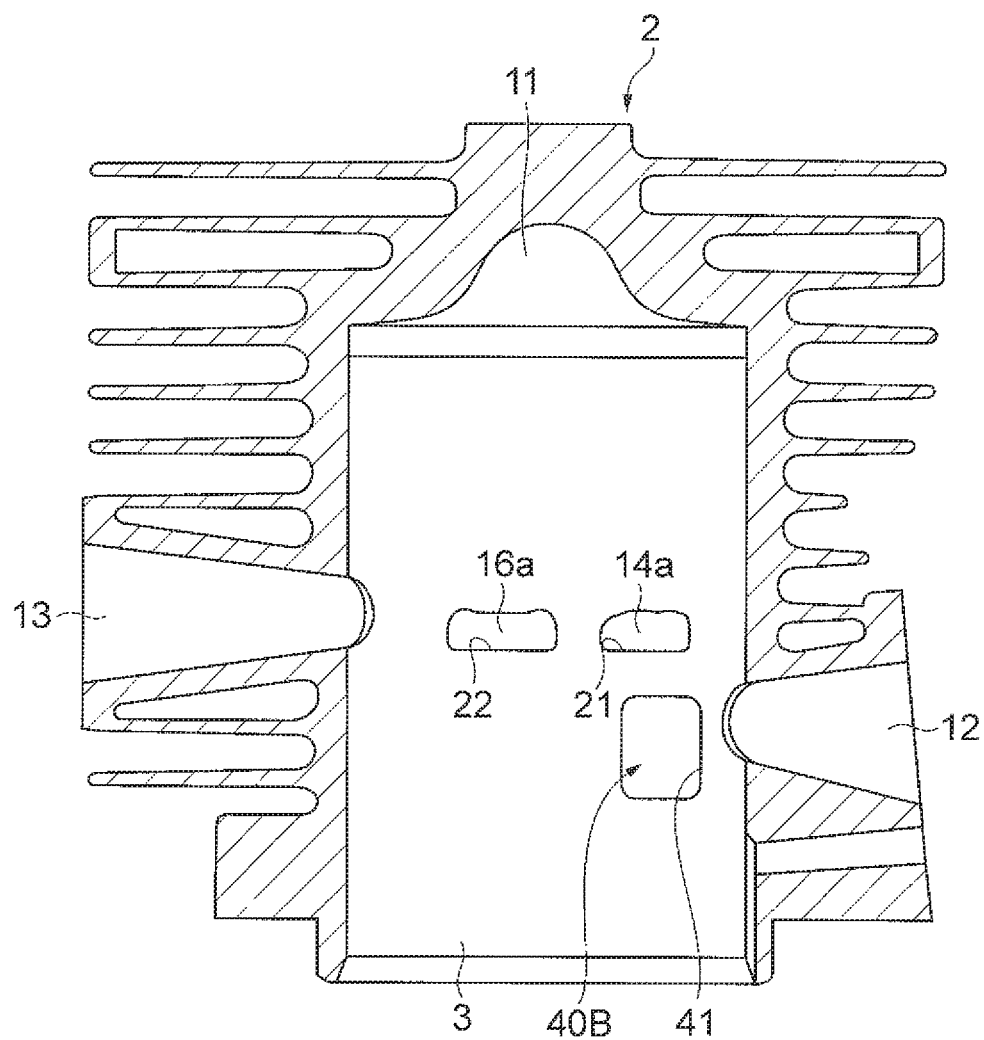
FIG. 10 is a vertical cross-sectional view of the cylinder of the two-cycle engine according to the third embodiment.
Figure 11A:
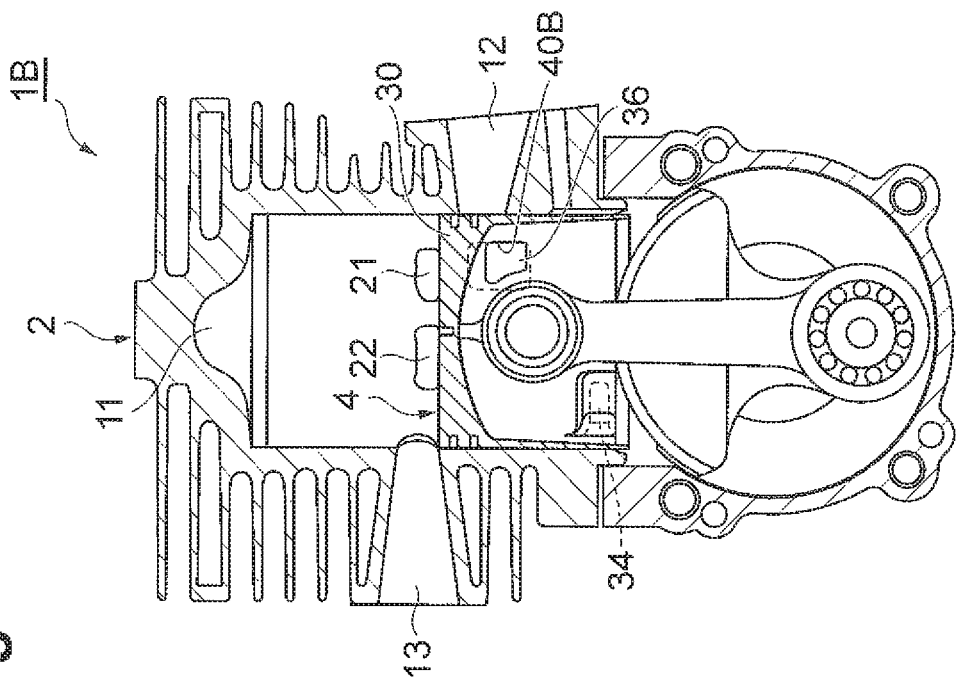
Figure 11B:
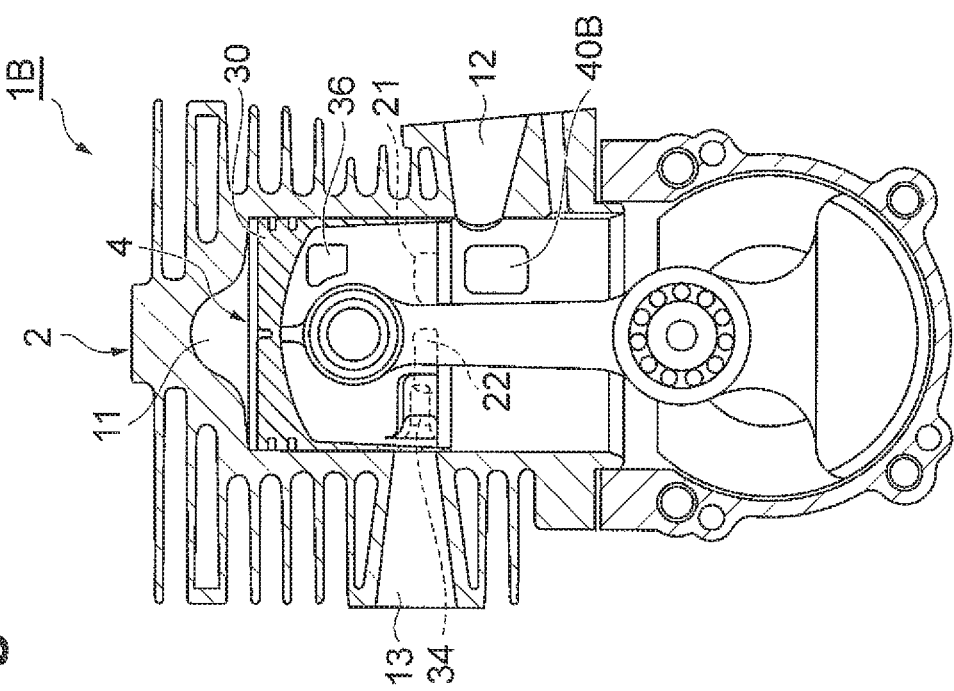
Figure 12A:
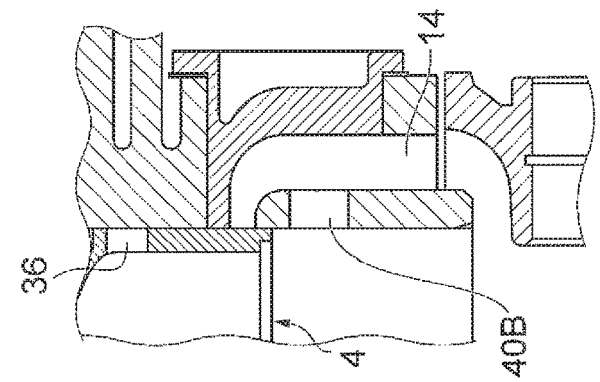
FIG. 12A to FIG. 12D are cross-sectional views of the two-cycle engine of the third embodiment along the line A-A in FIG. 2, and drawings showing respective states with reciprocal motion of the piston.
Figure 12B:
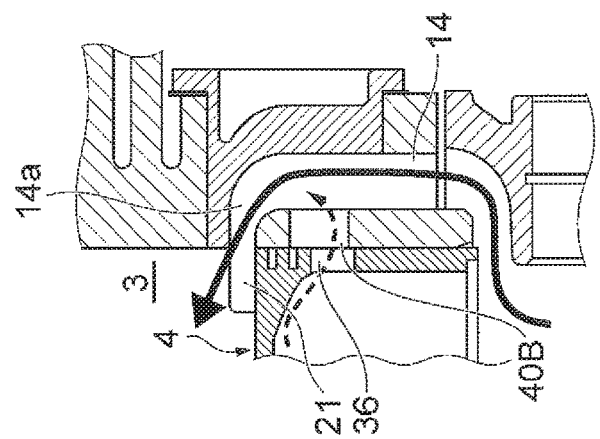
Figure 12C:
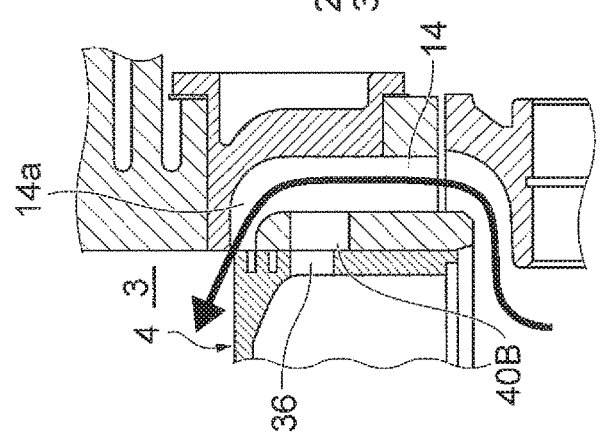
Figure 12D:
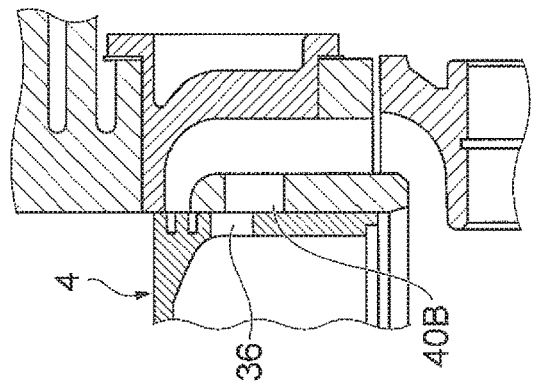

As shown in FIG. 10, the cylinder 2 is provided with the communication passage 40B of a rectangular prism shape which is open to the bore section 3, below the suction-side scavenging opening 21 of the suction-side scavenging passage 14. The communication passage 40B has a predetermined width and length in the direction of axis L. A circumferential width of the communication passage 40B is the same as that of the communication passage 40 of the engine 1. The base end of the communication passage 40B communicates with the bore section 3 only and the tip end of the communication passage 40 communicates with the central portion of the suction-side scavenging passage 14 only. In this manner, the communication passage 40B communicates with the bore section 3 and the suction-side scavenging passage 14. As shown in FIGS. 11A and 11B and FIGS. 12A to 12D, the opening 41 is longer than the through hole 36 of the piston 4, in the direction of axis L.

In the engine 1B with this communication passage 40B, the through hole 36 and the communication passage 40B come to communicate with each other at the timing shown in FIGS. 11A and 11B and FIGS. 12A to 12D, thereby achieving the same action and effect as the engine 1.

Although the communication passage 40B merges at the central portion of the suction-side scavenging passage 14, it causes little influence on the original scavenging direction determined by the suction-side scavenging passage 14, i.e., on the introduction direction into the bore section 3 because there is a sufficient distance between the merging location and the guide portion 14a.

The embodiments of the present disclosure have been described above but the present invention is not limited to the above embodiments. Only one through hole 36 may be formed in the peripheral wall portion 31, corresponding to only either one of the suction-side scavenging passages 14. As described above, the shape, size, and location of the through hole 36 and the shape, size, and location of the communication passage 40, 40A, or 40B can be set separately and independently of the scavenging timing of the engine 1, so as to realize arbitrary communication timing.

The communication passage 40, 40A, or 40B does not have to be limited to the case where it is formed below the suction-side scavenging opening 21, but may be formed below the exhaust-side scavenging opening 22. The communication passage 40, 40A, or 40B may be configured to make the exhaust-side scavenging passage 16 communicate with the interior of the piston 4 through the through hole 36. There are no particular restrictions on the location and shape of the communication passage 40, 40A, or 40B and the location and shape of the opening 41.

Without having to be limited to the case where the cylinder 2 is provided with the four scavenging passages of the pair of suction-side scavenging passages 14 and the pair of exhaust-side scavenging passages 16, it is also possible to adopt a configuration wherein the cylinder 2 is provided with one suction-side scavenging passage 14 and one exhaust-side scavenging passage 16. The present invention is not limited to the configuration wherein the suction-side scavenging passage 14 is configured to introduce the fresh mixture gas and the exhaust-side scavenging passage 16 is configured to introduce the EGR gas. The present invention can also be applied to stratified scavenging engines of a type making use of air. Only one pair of scavenging passages radially opposed to each other may be provided between the suction port 12 and the exhaust port 13. The cylinder 2 may be provided with only one scavenging passage. In that case, the communication passage 40, 40A, or 40B may be configured to communicate with at least one scavenging passage.

The through hole 36 may be configured to communicate with the opening 41 of the communication passage 40, 40A, or 40B at least in a partial interval of the scavenging stroke with reciprocal motion of the piston 4.

What is claimed is:

1. A two-cycle engine comprising:
a cylinder having a bore section of a cylindrical shape and a combustion chamber connected continuously to one side of the bore section in an axial direction;
a crankcase arranged on the other side of the cylinder in the axial direction and having a crank chamber connected continuously to the other side of the bore section; and
a piston arranged in the bore section and being reciprocally movable along the axial direction between the combustion chamber and the crank chamber,
wherein the piston has a crown portion opposed to the combustion chamber and a peripheral wall portion of a cylindrical shape provided continuously from the crown portion and extending along a bore surface of the bore section, wherein an interior space of the piston is at least partially formed by an inner side of the crown portion and the peripheral wall, the peripheral wall being provided with at least one through hole penetrating completely through the peripheral wall portion into the interior space of the piston, wherein the cylinder is provided with at least one scavenging passage having a first opening being open in the bore surface and configured to make the bore section and the crank chamber communicate with each other, and at least one communication passage having a second opening being open in the bore surface on the other side with respect to the first opening and configured to make the bore section and the scavenging passage communicate with each other, wherein the second opening is located at a position corresponding to the through hole of the piston in a circumferential direction of the bore section, wherein the cylinder and the piston are configured so that the through hole overlaps the second opening to communicate with the communication passage at least in a partial interval of a scavenging stroke in which the first opening becomes open in the bore surface on the one side of the piston with reciprocal motion of the piston, the scavenging passage additionally in communication with the interior space of the piston via the through hole and the communication passage, when the through hole overlaps the second opening via the through hole and the communication passage, when the through hole overlaps, and wherein the scavenging passage includes a pair of suction-side scavenging passages arranged away from each other in the circumferential direction of the bore section, and a pair of exhaust-side scavenging passages arranged away from each other in the circumferential direction of the bore section and arranged on an exhaust port side with respect to a suction-side scavenging passages.

2. The two-cycle engine according to claim 1, wherein the second opening of the communication passage is longer than the through hole in the axial direction.

3. The two-cycle engine according to claim 1, wherein an end of the at least one communication passage on the other side is directly connected to an end portion of the scavenging passage on the crank chamber side.

4. The two-cycle engine according to claim 1, wherein an end of the at least one communication passage on the other side is directly connected to a central portion of the scavenging passage.

5. The two-cycle engine according to claim 1,
wherein the cylinder is provided with the suction port configured to communicate with the crank chamber through the bore section, and the exhaust port configured to communicate with the bore section and arranged so as to be opposed to the suction port in a radial direction of the bore section,
wherein the pair of suction-side scavenging passages is configured to introduce a working gas containing fuel into the bore section, in the scavenging stroke,
wherein the pair of exhaust-side scavenging passages is configured to introduce a non-working gas with a lower content of fuel than the working gas, into the bore section in the scavenging stroke, and
wherein the communication passage makes the bore section and the suction-side scavenging passage communicate with each other.

6. The two-cycle engine according to claim 5,
wherein the at least one communication passage is configured to introduce the working gas from an interior space of the piston into the pair of suction-side scavenging passages when the through hole and the second opening are overlapped.

7. A two-cycle engine comprising:
a crankcase including a crank chamber;
a cylinder comprising
a combustion chamber located at an opposite end of the cylinder from the crank chamber;
a bore section located between the crank chamber and the combustion chamber; and
a side wall circumferentially surrounding the bore section and including a first opening located adjacent to the bore section and a second opening located adjacent to the bore section,
wherein a scavenging passage is at least partially formed in the side wall and fluidly couples the first opening with the crank chamber, and
wherein a communication passage is at least partially formed in the side wall and fluidly couples the second opening with the scavenging passage; and
a piston mounted in the bore section of the cylinder, the piston comprising a peripheral wall extending along the side wall of the cylinder, an interior space of the piston located on an inner side of the peripheral wall, and a through hole penetrating completely through the peripheral wall into the interior space of the piston,
wherein the piston is configured to align the through hole with the second opening in the side wall of the cylinder to fluidly couple the through hole with the communication passage while the first opening fluidly couples the crank chamber with the bore section, and wherein the scavenging passage is fluidly coupled with the interior space of the piston via the through hole and the communication passage, when the through hole is aligned with the second opening, and
wherein the scavenging passage includes a pair of suction-side scavenging passages arranged away from each other in the circumferential direction of the bore section, and a pair of exhaust-side scavenging passages arranged away from each other in the circumferential direction of the bore section and arranged on an exhaust port side with respect to a suction-side scavenging passages.

8. The two-cycle engine according to claim 7, wherein the communication passage is fluidly coupled with the scavenging passage at an end portion of the scavenging passage in proximity to an opening of the crank-chamber.

9. The two-cycle engine according to claim 7, wherein the communication passage is fluidly coupled with the scavenging passage at a location between a central portion of the scavenging passage and an end portion of the scavenging passage.

10. The two-cycle engine according to claim 7,
wherein the pair of suction-side scavenging passages has respective first openings located adjacent to the bore section, wherein the first openings are spaced apart along a circumference of the bore section, and
wherein the pair of suction-side scavenging passages is configured to introduce a working gas containing fuel from the crank chamber into the bore section during a scavenging operation in which the first opening fluidly couples the crank chamber with the bore section.

11. The two-cycle engine according to claim 10, further comprising a pair of exhaust-side scavenging passages formed at least in part in the side wall, wherein pair of exhaust-side scavenging passages fluidly couples respective exhaust-side scavenging openings located adjacent to the bore section with respective exhaust-side crank-chamber openings, and wherein the pair of exhaust-side scavenging passages is configured to introduce a non-working gas into the bore section during the scavenging operation, the non-working gas having a fuel content lower than a fuel content of the working gas.

12. The two-cycle engine according to claim 11, wherein an exhaust port is formed in the side wall of the cylinder to draw out gas from the bore section, and the exhaust port is located closer to the exhaust-side scavenging openings, as compared to the first openings of the pair of suction-side scavenging passages.

13. The two-cycle engine according to claim 12, further comprising grooves formed on an outer periphery of the peripheral wall of the piston, each of the grooves being configured to fluidly couple the exhaust port with the pair of exhaust-side scavenging passages when the piston is located near a top dead center.

14. A two-cycle engine comprising:
a crankcase including a crank chamber;
a cylinder comprising
a combustion chamber located at an opposite end of the cylinder from the crank chamber;
a bore section located between the crank chamber and the combustion chamber and;
a side wall circumferentially surrounding the bore section and including a first opening located adjacent to the bore section and a second opening located adjacent to the bore section;
wherein a scavenging passage is at least partially formed in the side wall and fluidly couples the first opening with a crank-chamber opening,
wherein the scavenging passage comprises a central portion located between the first opening and the crank-chamber opening, and
wherein a communication passage is at least partially formed in the side wall and fluidly couples the second opening with the scavenging passage at a location between the central portion and the crank-chamber opening;
a piston mounted in the bore section of the cylinder, the piston comprising a peripheral wall extending along the side wall of the cylinder, an interior space of the piston located on an inner side of the peripheral wall, and a through hole formed penetrating completely through the peripheral wall into the interior space of the piston,
wherein the piston is configured to align the through hole with the second opening in the side wall of the cylinder to fluidly couple the through hole with the communication passage, and wherein the scavenging passage is fluidly coupled with the interior space of the piston via the through hole and the communication passage, when the through hole is aligned with the second opening and
wherein the scavenging passage includes a pair of suction-side scavenging passages arranged away from each other in the circumferential direction of the bore section, and a pair of exhaust-side scavenging passages arranged away from each other in the circumferential direction of the bore section and arranged on an exhaust port side with respect to a suction-side scavenging passages.

15. The two-cycle engine according to claim 14, wherein the through hole of the piston is configured to align with the second opening while the first opening fluidly couples the crank chamber with the bore section.

16. The two-cycle engine according to claim 14, wherein the scavenging passage further comprises an end portion located between the central portion and the crank-chamber opening, and wherein the location that the communication passage is fluidly coupled with the scavenging passage is at the end portion.

17. The two-cycle engine according to claim 14, wherein the scavenging passage further comprises an end portion located between the central portion and the crank-chamber opening, and wherein the location that the communication passage is fluidly coupled with the scavenging passage is between the central portion and the end portion.

18. The two-cycle engine according to claim 14, wherein the scavenging passage further comprises an end portion located between the central portion of the scavenging passage and the crank-chamber opening, and wherein the location that the communication passage is fluidly coupled with the scavenging passage is between the end portion and the crank-chamber opening.

19. The two-cycle engine according to claim 14, wherein the crank chamber comprises a crank wall circumferentially surrounding the crank chamber, and wherein a portion of the scavenging passage is formed in the crank wall to fluidly couple the first opening with the crank-chamber opening located adjacent to the crank chamber.

* * * * *